United States Patent [19]
Yamada et al.

[11] Patent Number: 5,631,648
[45] Date of Patent: May 20, 1997

[54] SIGNAL COMPRESSION OR EXPANSION CIRCUIT FOR MOBILE COMMUNICATION

[75] Inventors: Takaaki Yamada; Kazuo Kumano, both of Kanagawa; Kazuhiro Takeda, Nagasaki, all of Japan

[73] Assignee: Sony Corporation, Tokyo, Japan

[21] Appl. No.: 353,615

[22] Filed: Dec. 12, 1994

Related U.S. Application Data

[63] Continuation of Ser. No. 2,262, Jan. 8, 1993, abandoned.

[30] Foreign Application Priority Data

Jan. 8, 1992 [JP] Japan ................... 4-020541

[51] Int. Cl.$^6$ ............... H03M 1/88; H04B 1/64
[52] U.S. Cl. ............... 341/138; 333/14; 370/202; 341/110; 341/154
[58] Field of Search ................. 333/14; 341/138, 341/139, 140, 110, 144, 154; 370/7

[56] References Cited

U.S. PATENT DOCUMENTS

| | | | |
|---|---|---|---|
| 2,889,409 | 6/1959 | Carbrey | 341/138 |
| 3,684,968 | 8/1972 | Carroll | 341/138 |
| 3,882,484 | 5/1975 | Brokaw et al. | 341/138 |
| 4,020,485 | 4/1977 | Busby | 341/138 |
| 4,062,013 | 12/1977 | Nagahama | 341/138 |
| 4,851,842 | 7/1989 | Iwamatsu | 341/139 |
| 4,875,049 | 10/1989 | Yoshida | 341/139 |

FOREIGN PATENT DOCUMENTS 1-71309  3/1989  Japan ................... 333/14

OTHER PUBLICATIONS

Analog Devices, Inc.; *Analog–Digital Conversion Handbook*; ©1986 Analog Devices, Inc.; pp. 117–120.

*Primary Examiner*—Howard L. Williams
*Attorney, Agent, or Firm*—Hill, Steadman & Simpson

[57] ABSTRACT

A signal-processing circuit adapted for signal compression and expansion performed in the transmitter and receiver of mobile communication equipment. The signal-processing circuit comprises a multiplication type D/A converter to which an analog signal is applied, a level detector circuit that detects the level of the analog signal, and an A/D converter. The D/A converter converts the analog input signal into an analog output signal having an amplitude corresponding to digital control data. The A/D converter digitizes the output signal from the level detector circuit and supplies it as said digital control data to the D/A converter. These circuits can be fabricated from CMOS circuits.

9 Claims, 8 Drawing Sheets

Level Detector

SIGNAL COMPRESSION OR EXPANSION CIRCUIT FOR MOBILE COMMUNICATION

This is a continuation of application Ser. No. 08/002,262, filed Jan. 8, 1993, now abandoned.

BACKGROUND OF THE INVENTION

1. Field of the Invention

The present invention relates to a signal-processing circuit and, more particularly, to a signal-processing circuit adapted for signal compression and expansion performed in a transmitter and in a receiver used in a mobile communication system using automobile telephony or other mobile telephony.

2. Description of the Prior Art

Where an analog signal such as an audio signal is modulated and transmitted by mobile communication equipment using automobile telephony or other mobile telephony, signal compression and expansion circuits are used to compress and transmit the signal. When the signal is received, it is expanded to reduce noise. One example of the structure of a baseband signal-processing circuit of a transmitter/receiver used in a mobile communication system employing these signal compression and expansion circuits is shown in FIG. 1.

Figure 1:
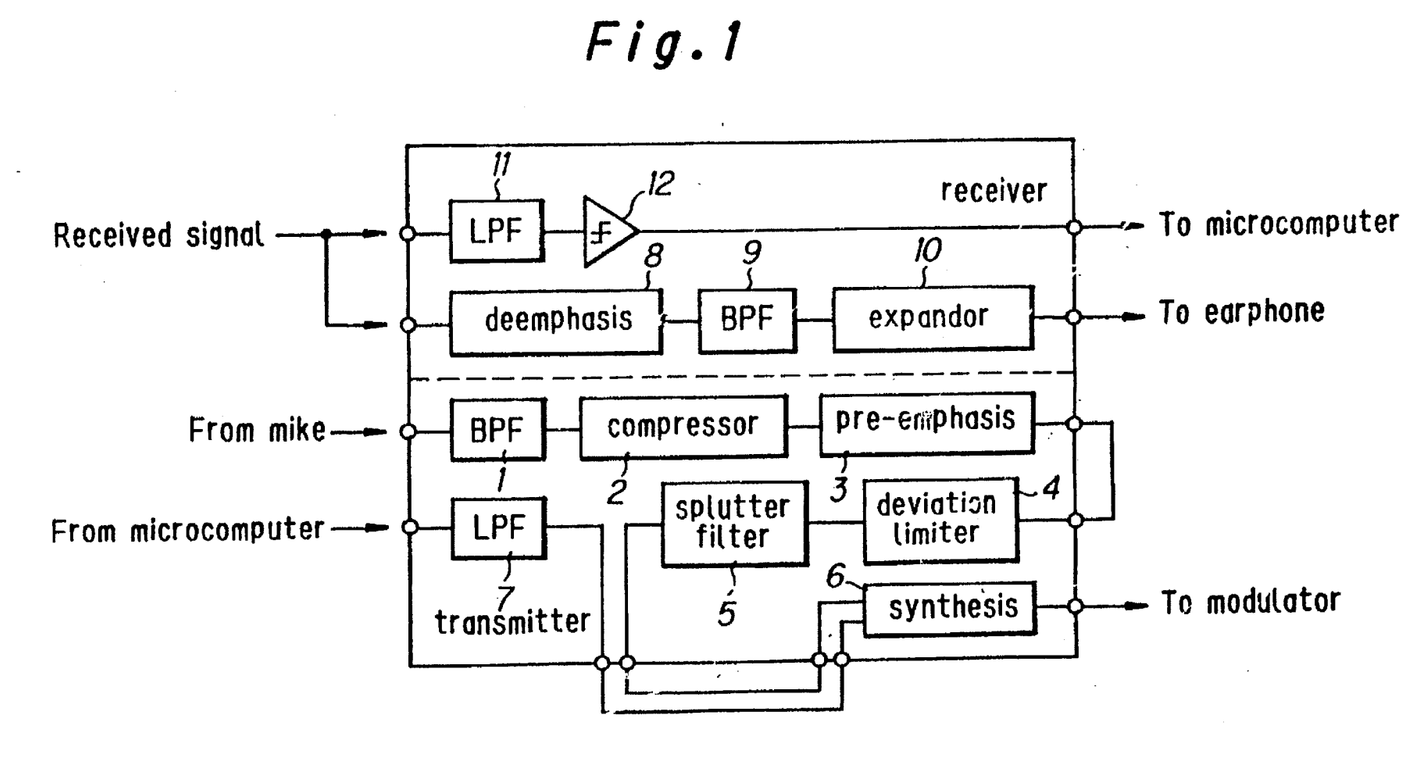
FIG. 1 is a block diagram of a baseband signal-processing circuit in the transmitter and receiver of a conventional mobile communication system.

Referring to FIG. 1, an audio signal is received from a microphone (mike) on the side of the transmitter. A requisite band is extracted by a bandpass filter 1. Then, the signal is compressed into a narrower range of amplitudes by a signal compressor circuit 2. The RF energy level of this compressed audio signal is increased by a pre-emphasis circuit 3. The output signal from this pre-emphasis circuit 3 is supplied to a signal synthesis circuit 6 via a deviation limiter 4 and via a splutter filter 5. The signal synthesis circuit 6 combines digitally coded data applied from a microcomputer (abbreviated micro) via a low-pass filter 7 with the audio signal, the digitally coded data indicating the used channel or other information. The output signal from the signal synthesis circuit 6 is supplied to a modulator circuit (not shown), where the signal is frequency-modulated. This frequency-modulated signal is then transmitted.

On the side of the receiver, the RF component signal level of the received analog signal is returned to the original level by a deemphasis circuit 8. Then, a requisite band is extracted by a bandpass filter 9, and the original signal prior to the compression is reconstructed by a signal expansion circuit 10 and supplied to an earphone, for example. The data component which is included in the received analog signal and indicates the used channel or other information is extracted by a low-pass filter 11. The output signal from this filter 11 is shaped into a rectangular wave by a wave-shaping circuit 12 and supplied to the microcomputer as digitally coded data indicating the used channel.

Figure 2:
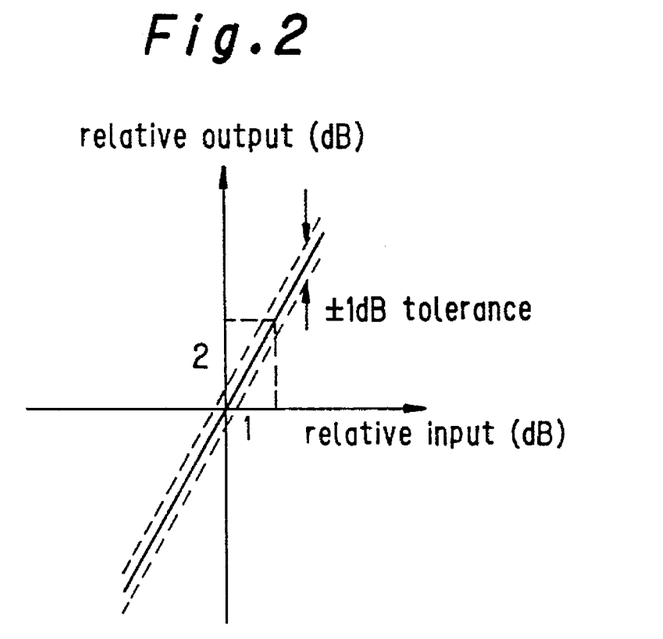
FIG. 2 is a graph showing the input/output characteristics of the signal expansion circuit shown in FIG. 1.

The input/output characteristics of the signal expansion circuit 10 used in the above-described mobile communication system are shown in FIG. 2. A standard stipulates that when the relative input changes by 1 dB, the relative output varies by 2 dB. The input/output characteristics of the signal compressor circuit 2 are exactly opposite to the input/output characteristics of the signal expansion circuit 10.

Figure 3:
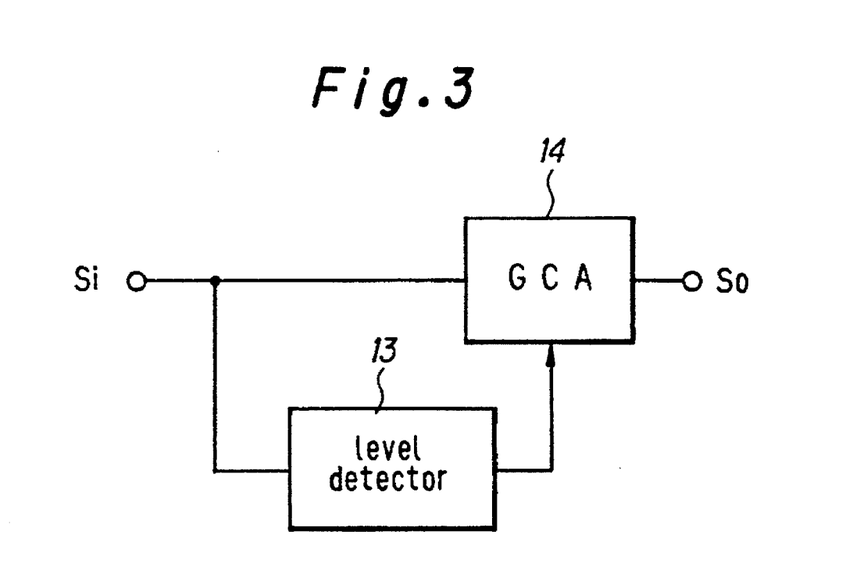
FIG. 3 is a block diagram of the signal expansion circuit shown in FIG. 1.

A conventional structure of this signal expansion circuit 10 is shown in FIG. 3. This circuit includes a level detector circuit 13 that detects the level of its analog input signal $S_i$ which is also applied to a gain control amplifier (GCA) 14. The gain of this amplifier 14 is controlled according to the output signal from the detector circuit 13. As a result, an expanded analog signal $S_o$ is delivered from the amplifier 14. To provide a signal compressor circuit 2 instead, negative feedback is applied to the signal expansion circuit 10 of the structure described above.

Heretofore, ICs comprising bipolar devices have been widely used as the conventional signal compressor circuit 2 and as the signal expansion circuit 10 described above. Since limitations are imposed on the electric power supplied to an automobile telephone or other mobile telephone, the use of a device consuming only a small amount of electric power is preferable. Accordingly, there is an increasing demand for a signal compressor circuit 2 and a signal expansion circuit 10 which are fabricated from CMOS circuits. However, the present situation is that signal compressor circuits and signal expansion circuits which are made of CMOS circuits and have good input/output characteristics have not yet realized.

OBJECTS AND SUMMARY OF THE INVENTION

It is an object of the present invention to provide a signal-processing circuit consuming only a small amount of electric power by achieving a signal compressor or expansion circuit having good input/output characteristics by a CMOS process.

A signal expansion circuit is achieved in accordance with the teachings of the invention by providing: a multiplication type digital-to-analog converter which converts an analog input signal into an analog output signal having an amplitude corresponding to digital control data; a level detector circuit that detects the level of the analog input signal; and an analog-to-digital converter which digitizes the output signal from the level detector circuit and supplies this digitized signal as the aforementioned digital control data to the multiplication type digital-to-analog converter.

A signal compressor circuit is also achieved in accordance with the teachings of the invention by adding a negative feedback circuit to this signal expansion circuit and applying negative feedback to the signal expansion circuit.

The signal expansion circuit and the signal compressor circuit are each composed of a multiplication type digital-to-analog converter. These circuits can be fabricated from CMOS devices. The electric power consumed by the whole signal-processing circuit using these circuits can be reduced. Furthermore, the signal expansion circuit and the signal compressor circuit taking the form of CMOS devices can be fabricated on a single chip together with other CMOS ICs. Hence, the number of the components can be reduced. Consequently, the cost can be reduced.

Other objects and features of the invention will be apparent in the course of the description thereof which follows.

DETAILED DESCRIPTION OF THE PREFERRED EMBODIMENTS

Figure 4:
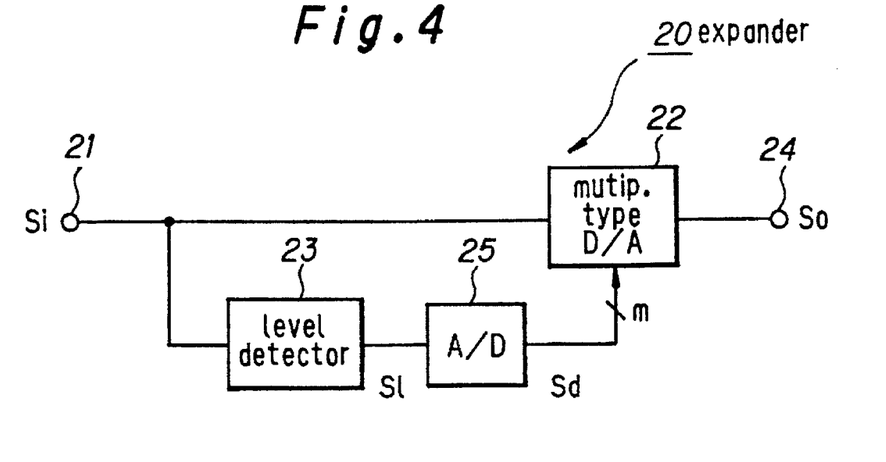
FIG. 4 is a block diagram of a first example of the signal expansion circuit according to the invention.

Referring to FIG. 4, there is shown a first example of the signal-processing circuit according to the invention. This signal-processing circuit, generally indicated by numeral 20, is used as a signal expansion circuit. This signal expansion circuit has an input terminal 21 to which an analog signal $S_i$ is applied. This analog signal $S_i$ is supplied to an m-bit multiplication type digital-to-analog converter 22 and also to a level detector circuit 23. The converter 22 converts the analog signal $S_i$ into an analog signal $S_o$ having an amplitude corresponding to m-bit digital control data (described later). The output signal from the D/A converter 22 is delivered to the outside through an output terminal 24. The level detector circuit 23 detects the level of the analog signal $S_i$. The output signal from the level detector circuit 23 is converted into the m-bit digital data by an analog-to-digital converter 25 and supplied as the digital control data to the multiplication type digital-to-analog converter 22. In this way, the signal expansion circuit 20 is formed.

Figure 5:
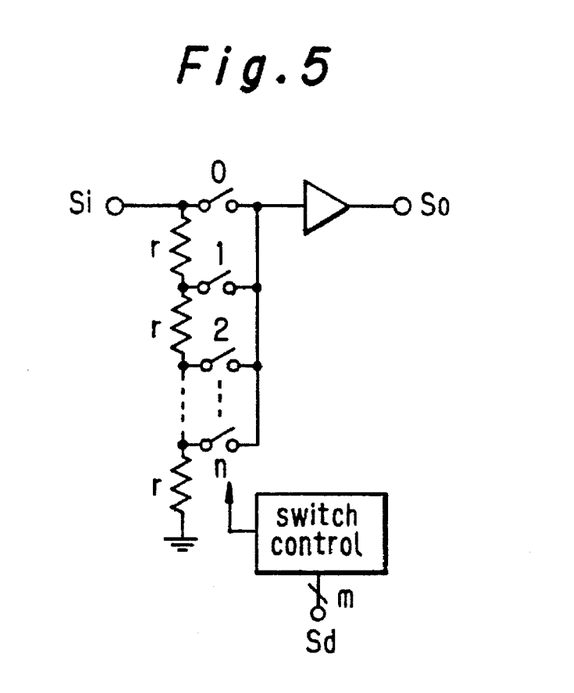
FIG. 5 is a circuit diagram of a multiplication type digital-to-analog converter according to the invention.
Figure 6:
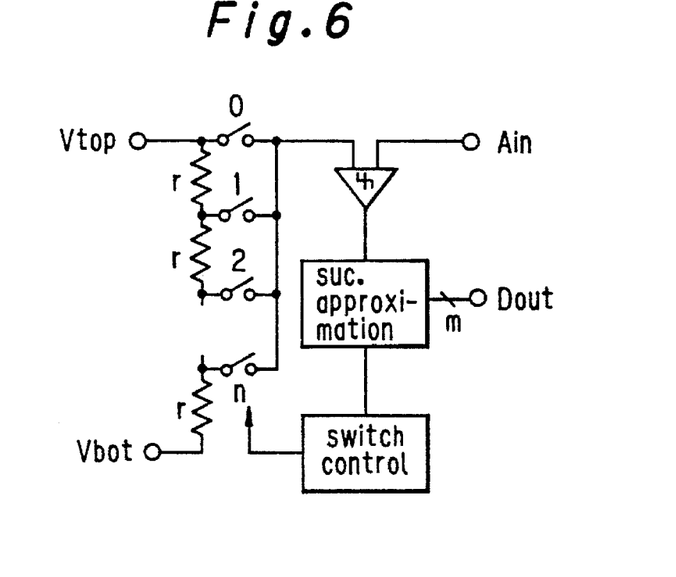
FIG. 6 is a circuit diagram of an analog-to-digital converter according to the invention.

One preferred example of the structure of the multiplication type D/A converter 22 is shown in FIG. 5. One preferred example of the structure of the A/D converter 25 is shown in FIG. 6. As can be seen from these figures, each of these converters 22 and 25 consists essentially of a bank of $2^m$ equal resistors of resistance r connected in series corresponding to m bits of data, $2^m$ switches, and a switch control circuit that closes one of these switches in response to the m bits of data. One end of each of the switches is connected together, while the other end is connected to the terminal of the corresponding one of the resistors. Since the frequency band of the input signal S1 to the A/D converter 25 is low, the structure of this converter is of simple successive approximation type.

Figure 7:
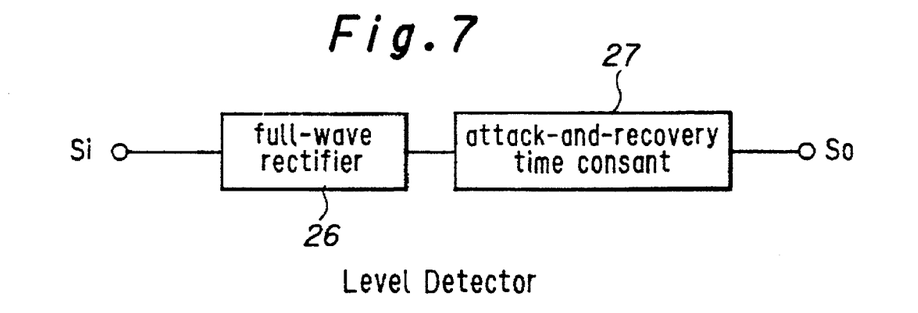
FIG. 7 is a block diagram of a level detector circuit according to the invention.

One example of the structure of the level detector circuit 23 is shown in FIG. 7. This level detector circuit 23 has a well-known circuit configuration. That is, the circuit 23 consists of a full-wave rectifier circuit 26 for providing full-wave rectification of the analog signal $S_i$ and an attack-and-recovery time constant circuit 27 that smooths the rectified output signal from the rectifier circuit 26 and sets an attack time and a recovery time. The output level from the time constant circuit 27 which indicates the detected level S1 of the analog signal $S_i$ is supplied to the A/D converter 25.

In the signal expansion circuit 20 of the configuration described above, the analog signal $S_i$ is supplied to the multiplication type D/A converter 22. The signal level is detected by the level detector circuit 23. The detected level S1 is converted into m-bit digital data Sd by the A/D converter 25. The multiplication type D/A converter 22 is controlled according to the digital data Sd. Thus, an expanded analog signal $S_o$ appears at the output terminal 24.

The process of this signal processing is described below, using mathematical formulas. The relation of the output signal $S_o$ to the input signal $S_i$ is given by $$S_o = S1 \cdot A S_i = |S_i| A S_i$$

|S| indicates the level of a signal S. Taking the levels of the signals on both sides results in $$|S_o| = |S_i|^2$$

Thus, we have $$20 \log |S_o| = 2 \cdot A 20 \log |S_i|$$

Therefore, the input/output characteristics shown in FIG. 2 are obtained. That is, when the input level varies by 1 dB, the output level varies by 2 dB.

In this way, the signal expansion circuit 20 is built, using the multiplication type D/A converter 22 based on the bank of resistors. Therefore, the expansion circuit 20 can be fabricated by CMOS processes. This makes it possible to reduce the amount of electric power consumed by the whole signal-processing circuit using the signal expansion circuit 20. Furthermore, the signal expansion circuit 20 and other CMOS ICs can be manufactured on a single chip, because the expansion circuit 20 consists of a CMOS circuit. In consequence, the number of the components can be reduced. Hence, the cost can be reduced.

Figure 8:
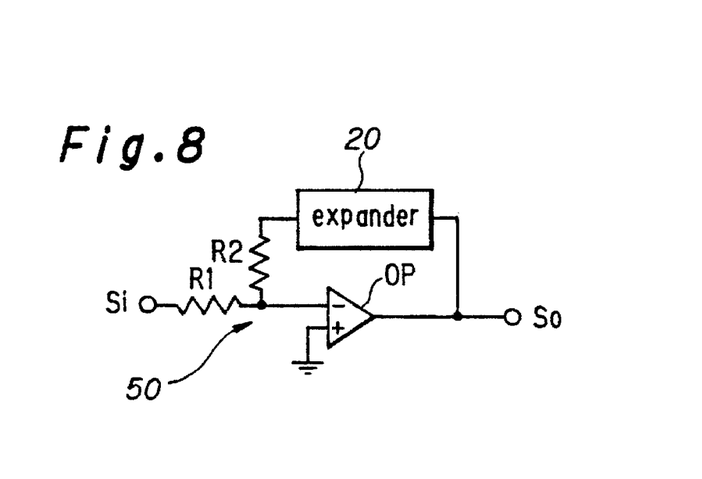
FIG. 8 is a circuit diagram of a signal compressor circuit according to the invention.

In the above embodiment, the signal expansion circuit 20 was described. As shown in FIG. 8, a signal compressor circuit can be fabricated by adding a negative feedback circuit 50 to the signal expansion circuit 20 described above. Specifically, the negative feedback circuit 50 has an operational amplifier OP. The analog input signal $S_i$ is applied to the inverting input of the amplifier OP via a resistor R1. The output from this operational amplifier OP is taken as the analog output signal $S_o$ and applied to the expansion circuit 20. The output signal from the expansion circuit 20 is applied to the non-inverting input of the amplifier OP via a resistor R2. Negative feedback is applied to the expansion circuit 20. Other examples of the signal expansion circuits are given below. Of course, signal compressor circuits can similarly be built by applying negative feedback to these examples of the signal expansion circuit.

Figure 9:
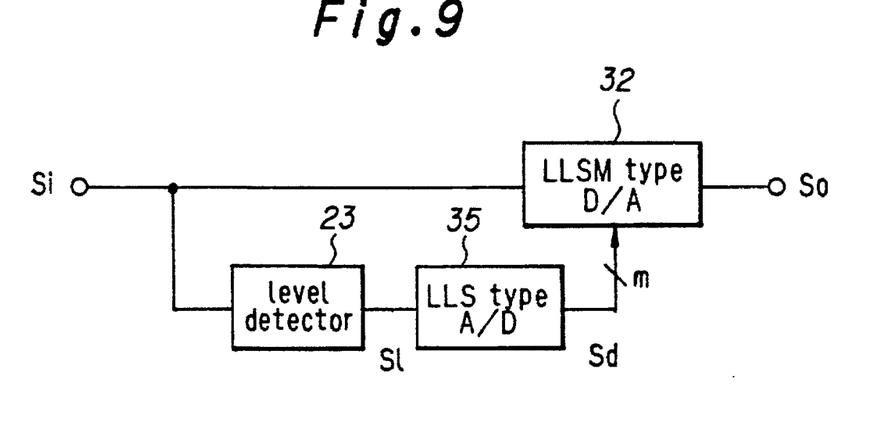
FIG. 9 is a block diagram of a second example of the signal expansion circuit according to the invention.

FIG. 9 is a block diagram of a second example of the signal-processing circuit according to the invention, the example being used as a signal expansion circuit. This example is similar to the first example except that a logarithmically linear scale multiplication type D/A converter 32 and a logarithmically linear scale A/D converter 35 are used instead of the multiplication type D/A converter 22 and the A/D converter 25, respectively, of the first example.

In the linear scale type as in the first example, as the level of the input signal $S_i$ decreases, the gain varies in greater steps. The input/output characteristics vary widely at low levels of the signal. As a result, the tolerance is made stricter.

If the tolerance at low levels of the signal should be mitigated, the high-resolution multiplication type D/A converter 22 and the A/D converter 25 are used. On the other hand, in the present example, logarithmically linear scale type devices are used as the multiplication type D/A converter and the A/D converter. Therefore, the variations in the gain are constant, irrespective of the signal level. In consequence, no high-resolution converter is necessitated.

Figure 10:
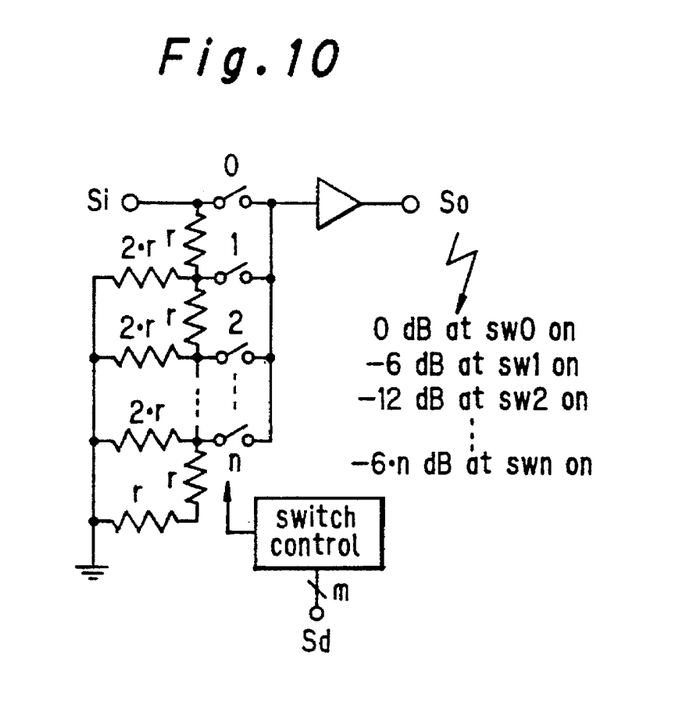
FIG. 10 is a circuit diagram of a logarithmically linear scale multiplication type digital-to-analog converter according to the invention.
Figure 11:
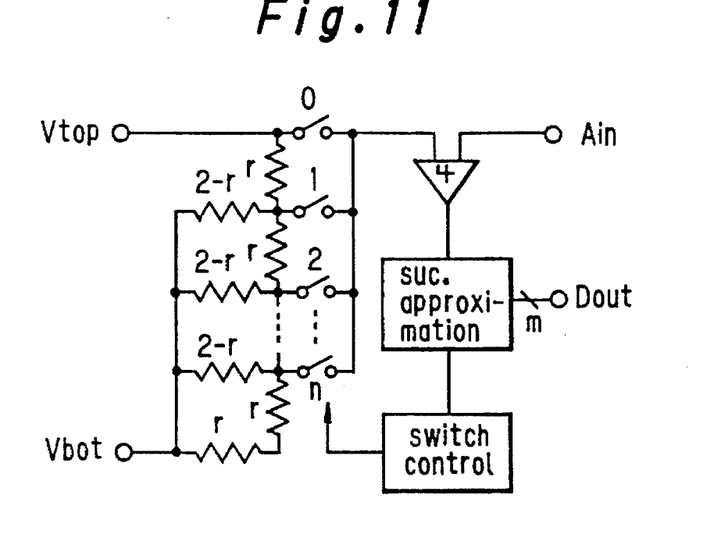
FIG. 11 is a circuit diagram of a logarithmically linear scale analog-to-digital converter according to the invention.

One example of the structure of the logarithmically linear scale multiplication type D/A converter 32 is shown in FIG. 10. One example of the structure of the logarithmically linear scale A/D converter 35 is shown in FIG. 11. In these examples, a resistor having a resistance of 2 Å r is connected with the terminal of each resistor having a resistance of r. In this way, a logarithmically linear scale having 6 dB steps is obtained. It is to be noted that the steps of the logarithmically linear scale are not limited to 6 dB. Rather, any arbitrary step can be derived by using resistors each having a resistance of nÅr (n is a positive real number) instead of the above-described resistors of the resistance 2År and appropriately setting the resistance r of the final stage.

Figure 12:
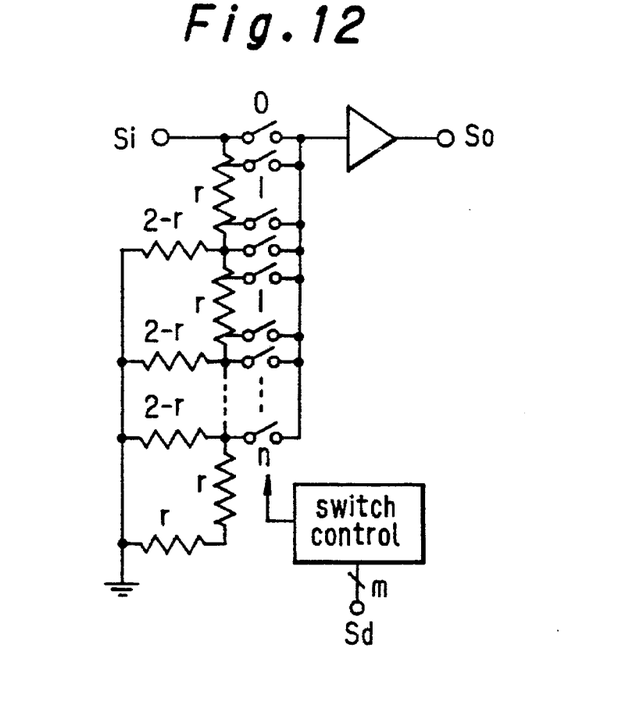
FIG. 12 is a circuit diagram of another logarithmically linear scale multiplication type digital-to-analog converter according to the invention.
Figure 13:
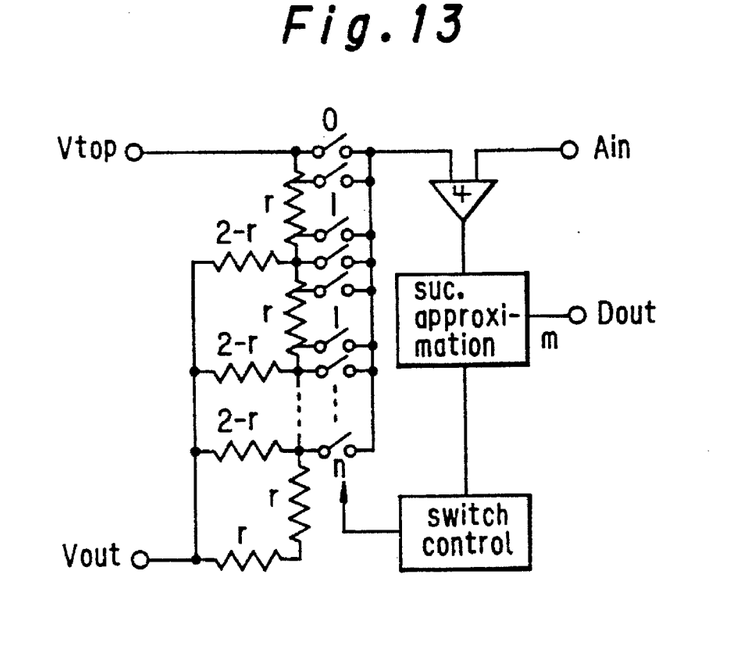
FIG. 13 Is a circuit diagram of another logarithmically linear scale analog-to-digital converter according to the invention.

If one tries to realize a logarithmically linear scale having small steps, the resistance value nÅr increases, making the scale impractical. Practical structures are shown in FIGS. 12 and 13. In either case, a logarithmically linear scale is formed not over the whole structure. This logarithmically linear scale has rough steps, e.g., 6 dB steps. Each resistance r is divided by a plurality of switches to form a linear scale in each 6 dB step. In this structure, the variations in the gain can be maintained substantially constant up to a low level without increasing the resistance value. In the same way as the foregoing examples, the steps of the logarithmically linear scales are not limited to 6 dB.

Figure 14:
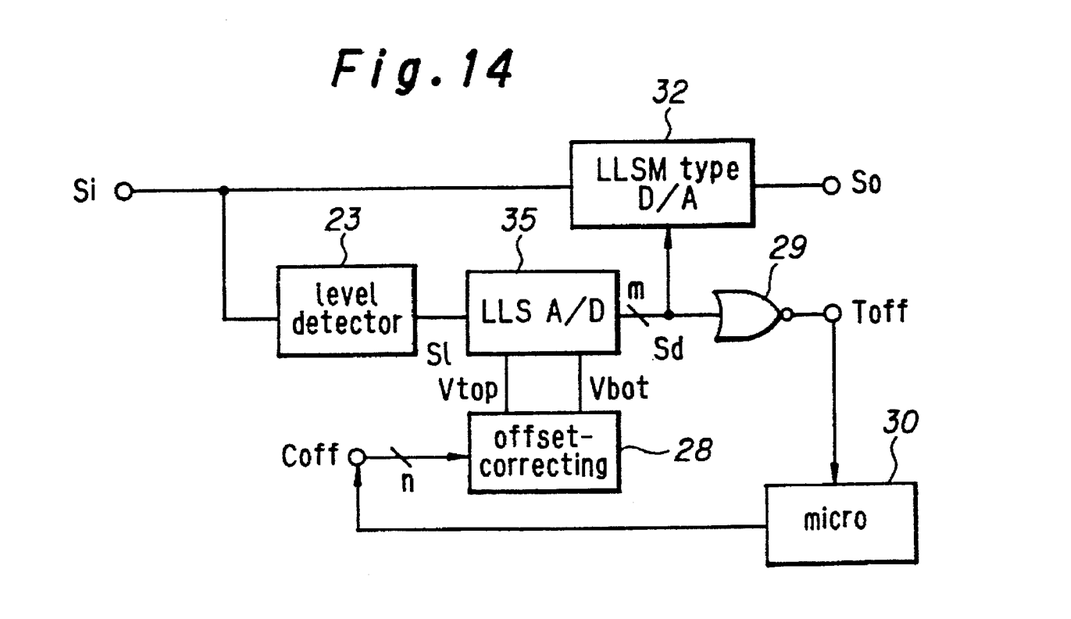
FIG. 14 is a block diagram of a third example of the signal expansion circuit according to the invention.

FIG. 14 is a block diagram of a third example of the signal-processing circuit according to the invention, the circuit being used as a signal expansion circuit. This example is similar to the second example except that a level offset-correcting circuit 28, a NOR gate circuit 29 used for correction check, and a microcomputer 30 (abbreviated micro) controlling the correcting circuit 28 are added. Of course, the same purpose can be performed by adding the circuits 28–30 to the first example.

Since the level detector circuit 23 is made up of some operational amplifiers, it is expected that some offset voltage is superimposed on the detected lever S1. This offset voltage makes stricter the tolerance for the input/output characteristics of the expansion circuit at low levels of signal. To prevent this, the level offset-correcting circuit 28 is provided in the present example.

Figure 15:
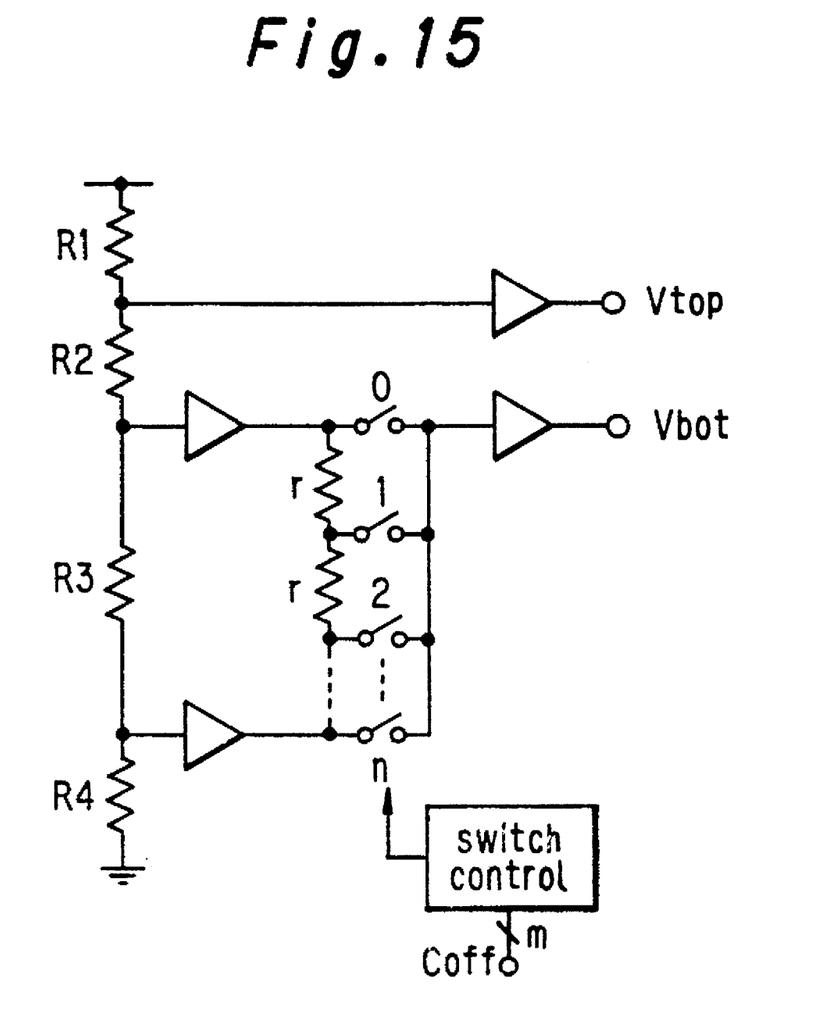
FIG. 15 is a circuit diagram of a level offset-correcting circuit according to the invention.

As shown in FIG. 15, this level offset-correcting circuit 28 controls the reference voltage Vbot applied to the bottom side of the A/D converter 35 by means of digital data Coff to change the reference voltage Vbot by the offset voltage, thus canceling the offset voltage. It is possible to know whether the offset voltage has been canceled, by reading the level of the offset check output Toff from the NOR gate circuit 29, i.e., judging whether the level is high or low.

More specifically, the input to the level detector circuit 23 is removed. Under this condition, the digital data Coff to the level offset-correcting circuit 28 is changed in a stepwise fashion while monitoring the digital control data Sd, i.e., the level of the offset check output Toff. If the digital control data Sd assume the least values (0, 0, 0, . . . , 0), the level of the offset check output Toff varies from low to high level. At this time the correction made by the level offset-correcting circuit 28 is stopped. This sequence can be easily performed by of software in the microcomputer 30.

As described thus far, in accordance with the present invention, a signal expansion or compressor circuit is fabricated from a multiplication type D/A converter consisting mainly of a bank of resistors. Therefore, this circuit can be made of CMOS circuits. Consequently, the electric power consumed by the whole signal-processing circuit using the signal expansion or compressor circuit can be reduced. In addition, the signal expansion or compressor circuit and other CMOS ICs can be fabricated as a chip, because the signal expansion or compressor circuit is made of a CMOS circuit. Hence, the number of the components and the cost can be reduced.

What is claimed is:

1. A signal-processing circuit formed by CMOS processes, comprising:

a logarithmically linear scale multiplication type CMOS digital-to-analog converter having a resistor bank which converts an audio range analog input signal applied to the converter into an analog output signal having an amplitude corresponding to digital control data;

a level detector means for detecting the level of audio range, said level means having a full wave rectifier and an attack and recovery circuit; and a logarithmically linear scale analog-to-digital converter which digitizes the output signal from the level detector means and supplies the digitized signal as the above-described digital control data to the multiplication type digital-to-analog converter such that a level of an output signal is a square of a level of said analog signal applied to said converter, said analog-to-digital converter being a successive approximation type converter having a plurality of resistors and switches connected to perform an analog to digital conversion, said switches including switches connected between said resistors and switches connected at intermediate points along said resistors to provide fine or coarse adjustments of the steps.

2. The signal-processing circuit of claim 1, further comprising an offset-correcting circuit which corrects the offset of the output signal from the level detector circuit.

3. The signal-processing circuit of claim 2, further comprising a control means which, when the input to the level detector circuit is absent, monitors said digital control data while changing the corrected control input to the offset-correcting circuit in a stepwise fashion and which, when the digital control data assume the least values, stops the correction made by the offset-correcting circuit.

4. The signal-processing circuit of claim 1, further comprising: a negative feedback circuit including an operational amplifier having an inverting input to which the analog input signal is applied, and wherein the output from the operational amplifier is used as said analog output signal and applied to the signal-processing circuit.

5. A signal expansion or compression circuit formed by CMOS processes, comprising:

a logarithmically linear scale multiplication type CMOS digital-to-analog converter having a resistor bank of resistors and a plurality Of switches connected to said resistor bank with ones of said switches connected between said resisters and others of said switches connected along said resistors to provide rough and fine levels and having an input for receiving an audio range analog signal and having a digital converter which converts an analog signal applied to the converter into an analog output signal having an amplitude corresponding to digital control data;

a level detector circuit that detects the level of the audio range analog input signal, said level detector circuit including a full wave rectifier and an attack and recovery circuit; and an analog-to-digital converter which digitizes the output signal from the level detector circuit and supplies the digitized signal as the above-described digital control data to the multiplication type digital-to-analog converter such that a level of an output signal is a square of a level of said analog signal applied to said converter.

6. A signal-processing circuit as claimed in claim 1, wherein said resistor bank comprises a plurality of first resistors connected to one another at junctions and a plurality of parallel connected second resistors connected to junctions of said first resistors, said digital-to-analog converter including a plurality of switches connected to said junctions of said first resistors, and a switch control circuit connected to operate said plurality of switches.

7. A signal-processing circuit as claimed in claim 1, wherein said signal-processing circuit is formed on a single circuit chip using CMOS techniques.

8. A signal expansion or compression circuit as claimed in claim 5, wherein said resistor bank comprises a plurality of first resistors connected to one another at junctions and a plurality of parallel connected second resistors connected to junctions of said first resistors, said digital-to-analog converter including a plurality of switches connected to said junctions of said first resistors, and a switch control circuit connected to operate said plurality of switches.

9. A signal expansion or compression circuit as claimed in claim 5, wherein said signal expansion or compression circuit is formed on a single circuit chip using CMOS techniques.

* * * * *